United States Patent
Peng et al.

(10) Patent No.: US 10,070,141 B2
(45) Date of Patent: Sep. 4, 2018

(54) METHOD AND APPARATUS FOR PROVIDING PREDICTION MODE SCALABILITY

(75) Inventors: Wen-Hsiao Peng, Palo Alto, CA (US); Yen-Kuang Chen, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 294 days.

(21) Appl. No.: 13/473,351

(22) Filed: May 16, 2012

(65) Prior Publication Data

US 2012/0224630 A1    Sep. 6, 2012

Related U.S. Application Data

(63) Continuation of application No. 12/251,346, filed on Oct. 14, 2008, now Pat. No. 8,199,809, which is a continuation of application No. 09/758,647, filed on Jan. 10, 2001, now abandoned.

(60) Provisional application No. 60/260,735, filed on Jan. 9, 2001.

(51) Int. Cl.
| | |
|---|---|
| *H04N 7/12* | (2006.01) |
| *H04N 19/34* | (2014.01) |
| *H04N 19/105* | (2014.01) |
| *H04N 19/61* | (2014.01) |
| *H04N 19/164* | (2014.01) |
| *H04N 19/184* | (2014.01) |

(52) U.S. Cl.
CPC ........... *H04N 19/34* (2014.11); *H04N 19/105* (2014.11); *H04N 19/164* (2014.11); *H04N 19/184* (2014.11); *H04N 19/61* (2014.11)

(58) Field of Classification Search
CPC .... H04N 19/34; H04N 19/105; H04N 19/164; H04N 19/184; H04N 19/61
See application file for complete search history.

(56) References Cited

U.S. PATENT DOCUMENTS

| | | | |
|---|---|---|---|
| 5,418,570 A | 5/1995 | Ueno et al. | |
| 5,436,665 A * | 7/1995 | Ueno .................. | H04N 19/105 375/240.14 |
| 5,440,345 A * | 8/1995 | Shimoda .................. | 375/240.14 |
| 5,450,209 A * | 9/1995 | Niimura et al. ............. | 386/329 |
| 5,475,435 A | 12/1995 | Yonemitsu et al. | |
| 5,619,256 A * | 4/1997 | Haskell et al. ................. | 348/43 |
| 5,677,735 A | 10/1997 | Ueno et al. | |

(Continued)

FOREIGN PATENT DOCUMENTS

| | | |
|---|---|---|
| EP | 0596423 | 5/1994 |
| WO | WO-0162010 | 8/2001 |

OTHER PUBLICATIONS

Intel Corporation, Non Final Office Action dated May 1, 2003; U.S. Appl. No. 09/758,647.

(Continued)

*Primary Examiner* — Nhon Diep
(74) *Attorney, Agent, or Firm* — Womble Bond Dickinson (US) LLP

(57) ABSTRACT

In an encoding process, video data are represented as a bitstream of a quantized base layer and at least two enhancement layers, with each picture in each layer identified by a start code. The base layer, plus a number of enhancement layers capable of being transmitted by the communication channel's bandwidth, are transmitted on the communication channel.

21 Claims, 7 Drawing Sheets

(56) References Cited

U.S. PATENT DOCUMENTS

| | | | |
|---|---|---|---|
| 6,108,039 A * | 8/2000 | Linzer | H04N 19/105 348/699 |
| 6,233,356 B1 * | 5/2001 | Haskell et al. | 382/243 |
| 6,498,865 B1 * | 12/2002 | Brailean et al. | 382/239 |
| 6,501,797 B1 | 12/2002 | Van Der Schaar et al. | |
| 6,580,754 B1 * | 6/2003 | Wan et al. | 375/240.01 |
| 6,639,943 B1 | 10/2003 | Radha et al. | |
| 6,731,811 B1 * | 5/2004 | Rose | H04N 19/105 348/397.1 |
| 6,816,194 B2 * | 11/2004 | Zhang et al. | 375/240.27 |
| 6,836,512 B2 | 12/2004 | Van Der Schaar et al. | |
| 6,940,903 B2 * | 9/2005 | Zhao et al. | 375/240.08 |
| 6,956,972 B2 * | 10/2005 | Wu et al. | 382/238 |
| 7,289,675 B2 * | 10/2007 | Rose | 382/238 |
| 7,496,236 B2 * | 2/2009 | Fogg | 382/233 |
| 7,813,429 B2 * | 10/2010 | Winger | H04N 19/56 375/240.16 |
| 2002/0034248 A1 | 3/2002 | Chen | |
| 2002/0071486 A1 | 6/2002 | Van Der Schaar et al. | |
| 2002/0080878 A1 | 6/2002 | Li | |
| 2002/0150158 A1 | 10/2002 | Wu et al. | |
| 2002/0159518 A1 * | 10/2002 | Bottreau et al. | 375/240.1 |
| 2002/0181580 A1 | 12/2002 | Van Der Schaar et al. | |

OTHER PUBLICATIONS

Intel Corporation, Non Final Office Action dated Feb. 25, 2004; U.S. Appl. No. 09/758,647.

Intel Corporation, Final Office Action dated Sep. 24, 2003; U.S. Appl. No. 09/758,647.

Intel Corporation, Final Office Action dated Aug. 2, 2004; U.S. Appl. No. 09/758,647.

Intel Corporation, Non Final Office Action dated Oct. 26, 2011; U.S. Appl. No. 12/251,346.

* cited by examiner

METHOD AND APPARATUS FOR PROVIDING PREDICTION MODE SCALABILITY

This is continuation of U.S. application Ser. No. 12/251,346 filed Oct. 14, 2008, which is a continuation of U.S. application Ser. No. 09/758,647 filed Jan. 10, 2001, which is a nonprovisional application claiming the benefits of provisional Application Ser. No. 60/260,735 filed Jan. 9, 2001, entitled "Providing Prediction Mode Fine Granularity Scalability."

BACKGROUND

Video is principally a series of still pictures, one shown after another in rapid succession, to give a viewer the illusion of motion. Before it can be transmitted over a communication channel, analog video may need to be converted, or "encoded," into a digital form. In digital form, the video data are made up of a series of bits called a "bitstream." When the bitstream arrives at the receiving location, the video data are "decoded," that is, converted back to a viewable form. Due to bandwidth constraints of communication channels, video data are often "compressed" prior to transmission on a communication channel. Compression may result in a degradation of picture quality at the receiving end.

A compression technique that partially compensates for loss (degradation) of quality involves separating the video data into a "base layer" and one or more "enhancement layers" prior to transmission. The base layer includes a rough version of the video sequence and may be transmitted using comparatively little bandwidth. Each enhancement layer also requires little bandwidth, and one or more enhancement layers may be transmitted at the same time as the base layer. At the receiving end, the base layer may be recombined with the enhancement layers during the decoding process. The enhancement layers provide correction to the base layer, consequently improving the quality of the output video. Transmitting more enhancement layers produces better output video, but requires more bandwidth.

Some compression methods and file formats have been standardized, such as the Motion Picture Experts Group (MPEG) standards of the International Organization for Standardization. For example, one widely-used standard for video compression is denoted as MPEG-2. A compression technique used in MPEG standards encodes changes between individual pictures rather than the pictures themselves. The process results in a substantial saving of bandwidth.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
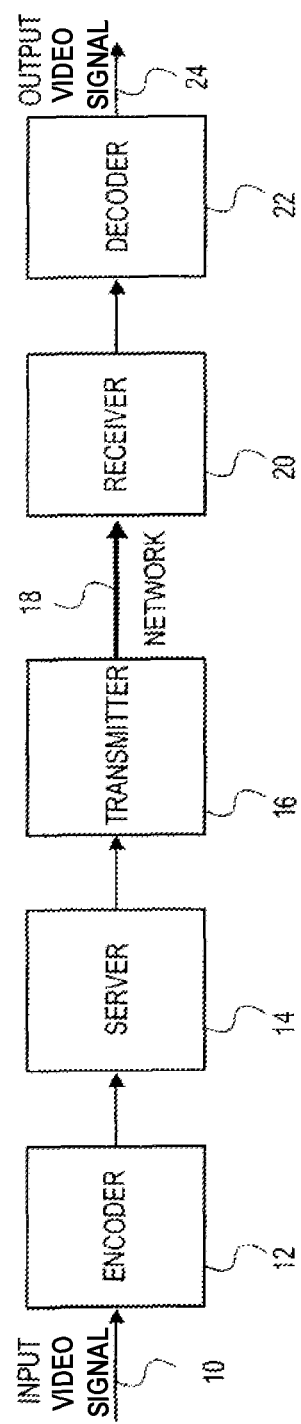
FIG. 1 is a functional block diagram showing a path of a video signal.

FIG. 1 is a block diagram showing a general path taken by video data being distributed over a network. The input video signal 10 is fed into an encoder 12, which converts the signal 10 into video data, in the form of a machine-readable series of bits, or bitstream. The video data are then stored on a server 14, pending a request for the video data. When the server 14 receives a request for the video data, it sends the data to a transmitter 16, which transmits the data along a communication channel 18 on the network. A receiver 20 receives the data and sends it as a bitstream to a decoder 22. The decoder 22 converts the received bitstream into an output video signal 24, which may be then be viewed.

The encoding done in encoder 12 may involve lossy compression techniques such as MPEG-4, resulting in abuse layer, that is, a body of data sufficient to permit generation of a viewable video sequence of lesser quality than is represented by the source video sequence. The base layer comprises a low-bandwidth version of the video sequence. If it were to be decoded and viewed, the base layer would be perceived as an inferior version of the original video. Enhancement techniques at the receiving end, to be discussed below, compensate for the missing data and produce a smooth and aesthetically pleasing output video.

Enhancement layers may capture the difference between a quantized/truncated base video picture and an original unquantized input video picture. Enhancement layers enhance the quality of the viewable video sequence generated from the base layer. Combining the base layer with a single enhancement layer at the receiving end produces a correction to the video data and an improved output video. Combining an additional enhancement layer provides additional correction and additional improvement. Combining the base layer with all enhancement layers at the receiving end will result in a video output of quality nearly equal to the original input video.

Typically each enhancement layer would be one "bit slice" of the difference data. In such an arrangement, each enhancement layer for each picture would consist of a series of bits. The enhancement layers are ordered in such a way that the first enhancement layer would contain the most significant bits, the second enhancement layer would contain the next most significant bits, and so on. This means that the most significant correction would be made by the first enhancement layer. Combining more enhancement layers would continue to improve the output quality. In this way, the quality of the output video can be "scaled" by combining different numbers of enhancement layers with the base layer. The process of using fewer or more enhancement layers to scale the quality of the output video is referred to as "Fine Granularity Scalability" or FGS. FGS may be employed to produce a range of quality of output video.

Although combining the base layer and all enhancement layers during the decoding process will produce an output video with picture quality nearly equal to the input video, bandwidth constraints of the communication channel may make this result unfeasible. Bandwidth constraints may allow some, but not all, enhancement layers to be transmitted with the base layer. FGS permits the base layer and enhancement layers to be stored in the memory of a server. Then the base layer can be transmitted with a number of enhancement layers suitable for the bandwidth of the particular channel. In general, the greater the bandwidth of the channel, the more enhancement layers may be transmitted along with the base layer, and the better the quality of the output video will be.

A viewer who receives data having more enhancement layers along a channel having a larger bandwidth will be able to view output video of better quality than a viewer who receives data having fewer enhancement layers along a channel having a smaller bandwidth. An advantage of the embodiment described herein is that the video data can be easily adapted to different channels having different bandwidths.

Figure 2:
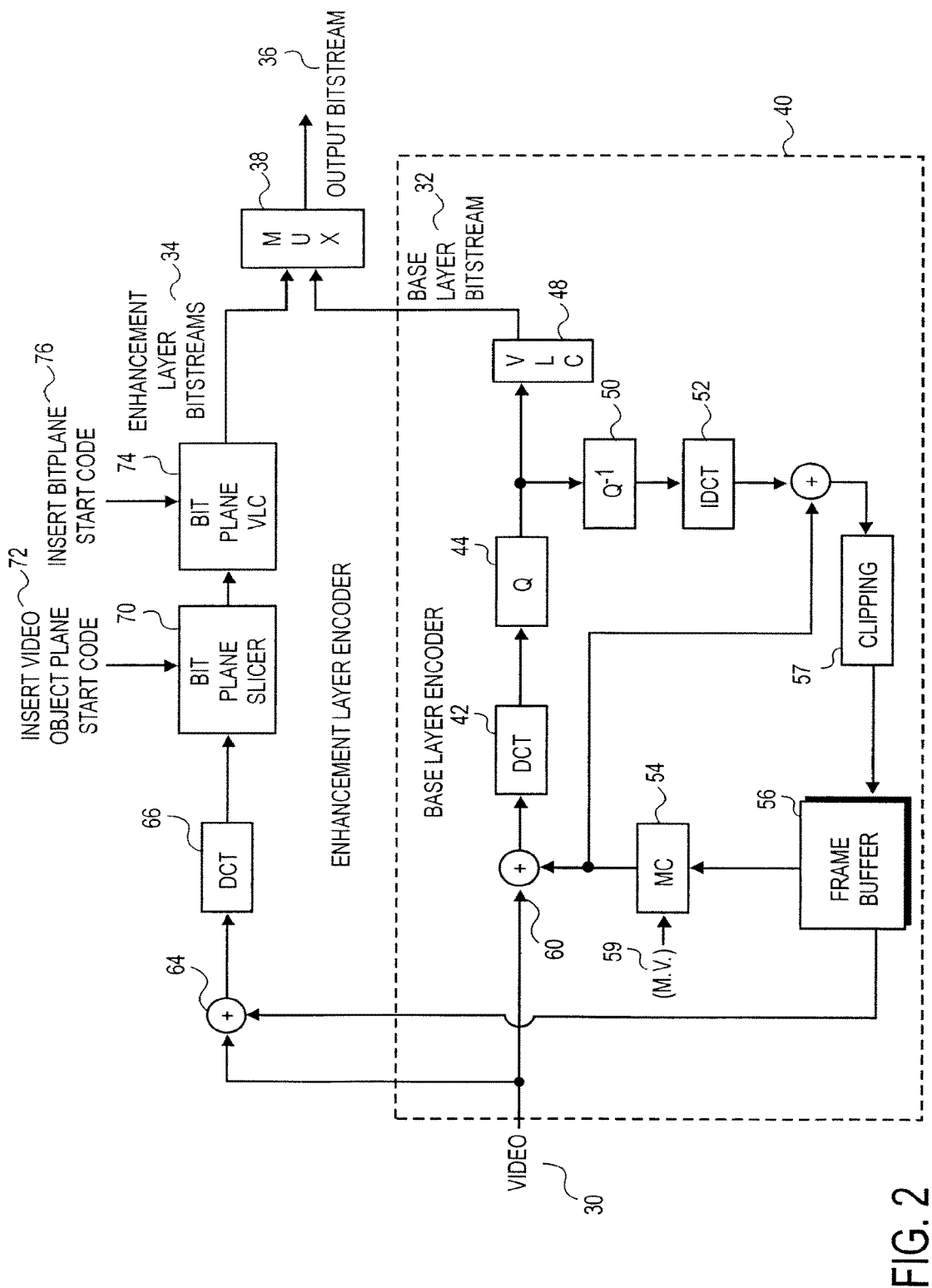
FIG. 2 is a block diagram showing video encoding and compression.

FIG. 2 demonstrates one embodiment of encoding and compression of a series of input pictures 30, resulting in a base layer bitstream of the video data 32 plus a bitstream of one or more enhancement layers 34. The base layer bitstream 32 and enhanced layer bitstream 34 may be combined into a single output bitstream 36 by a multiplexer (Mux) 38.

The base layer may be created by standard video encoding and compression techniques 40. The encoding and compression techniques 40 shown in FIG. 2 are illustrative but are not the only way to achieve encoding and compression. Encoding and compression may employ a discrete cosine transform (DCT) 42, quantization (Q) 44, and variable length coding (VLC) 48. FIG. 2 also includes techniques for encoding the changes between individual pictures, which include inverse quantization (IQ) 50, an inverse discrete cosine transform (IDCT) 52, motion compensation (MC) 54 with motion vectors ({M.V.}) 59 from motion estimation, frame store 56, and subtraction 60 of an earlier picture 62 from the input picture stream 30 to isolate the changes from one picture to the next.

FIG. 2 also shows a subtraction 64 which results in the creation of enhancement layers, which contain the various bits of the difference between the quantized base video (also known as, reconstructed pictures) and the unquantized input video. In FIG. 2, the enhancement layers corresponding to each picture represent enhancements to the changes between individual pictures, rather than enhancements to the individual pictures themselves. When the enhancement layer data are arranged into individual enhancement layers, the first enhancement layer would contain the most significant bits of enhancement data, the second enhancement layer would contain the next most significant bits of enhancement data, and so on. These arrangements of bits may be called "bit planes" and they may be generated by a bit plane slicer 70. In the creation of a bit plane, one or more start codes may be inserted into the bitstream as markers. FIG. 2 shows the insertion of two start codes 72, 76. A group of bit planes called a "video object plane" may be marked with a start code 72, and a start code 76 may also be inserted at bit plane VLC 74 to mark the beginning of each bit plane. The insertion of start codes to mark bit planes represents, in effect, markers for the enhancement layers in the bitstream.

The start codes are useful when the video data are decoded. A start code may be a unique, byte-aligned series of bytes. For example, a start code may consist of four bytes, the first three bytes identifying the start of picture data (a start-of-picture code), and the final byte identifying the data (an identification code). Ordinarily each enhancement layer corresponding to each picture in the base layer may be marked with a start code. In one embodiment, each picture in each enhancement layer may be marked with a start code as well. Byte-aligned start codes allow a parser or other processor easily to search a bitstream, to identify a start code and easily to parse the bitstream. Through the use of start codes, the bitstream may be parsed into a base layer of video data and two or ore layers of enhancement data.

Figure 3:
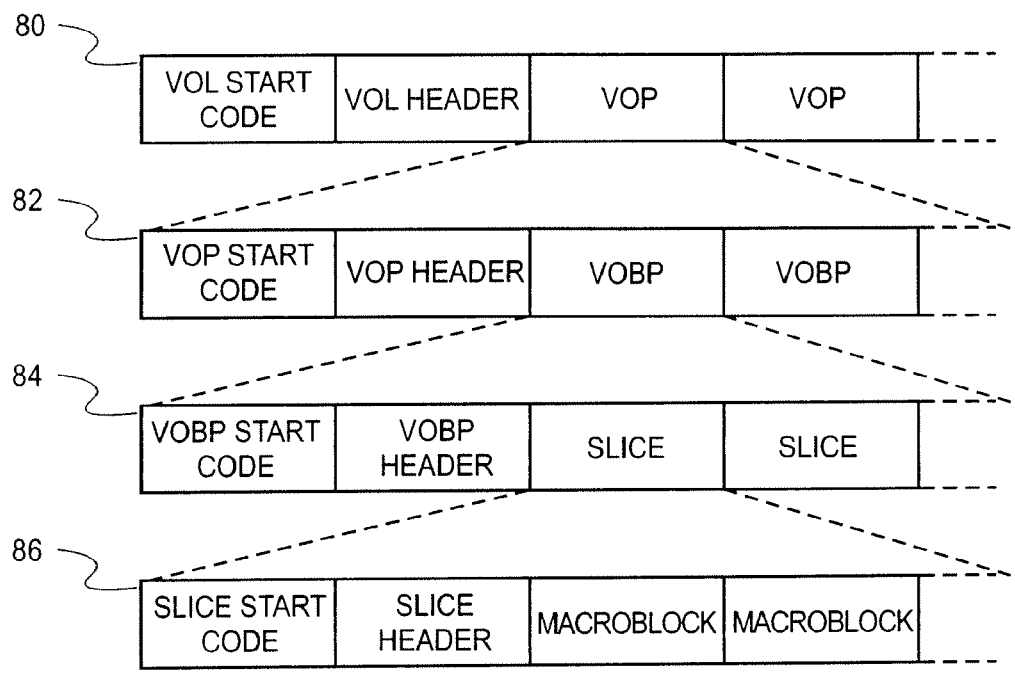
FIG. 3 is a hierarchical representation of enhancement layer data in a bitstream.

FIG. 3 provides an illustration of start codes that may be inserted into an enhancement layer bitstream. Although the bitstream may have several start codes to identify the presence of video data within a bitstream, the start of a particular video sequence may be marked with a "video object layer" (VOL) start code 80. Following the VOL start code 80 will be a series of pictures, which may be called "video object planes" or VOP. A VOP may represent actual picture data or it may represent changes from one picture to the next. Each picture or VOP may be marked with a VOP start code 82. VOP start code 82 may be inserted at bit plane slicer 70 in FIG. 2. In addition, each enhancement layer for each picture, called a "video object bit plane" (VOBP), be given its own VOBP start code 84. VOBP start code 84 may be inserted at bit plane VLC 74 in FIG. 2.

Each picture may in turn be composed of smaller units called "slices," and each slice may be given its own slice start code 86. Slices, which in general are horizontal strips of a picture, may in turn be made up of units such as macroblocks. Macroblocks, in general, are composed of 256 picture elements, or pixels, arranged in a 16-by-16 square. Each macroblock may also be marked with a start code.

In the absence of start codes for each picture in each enhancement layer, the data for individual enhancement layers may not be easily recovered. A computer processor ordinarily could not, by checking bytes of data, determine whether a particular byte was the first byte of data for a particular picture. A byte-aligned start code, by contrast, allows a computer processor to determine quickly where data for a particular picture begins and where the data for the particular picture ends. In this way, start codes permit the enhancement layers to be easily parsed.

Figure 4:
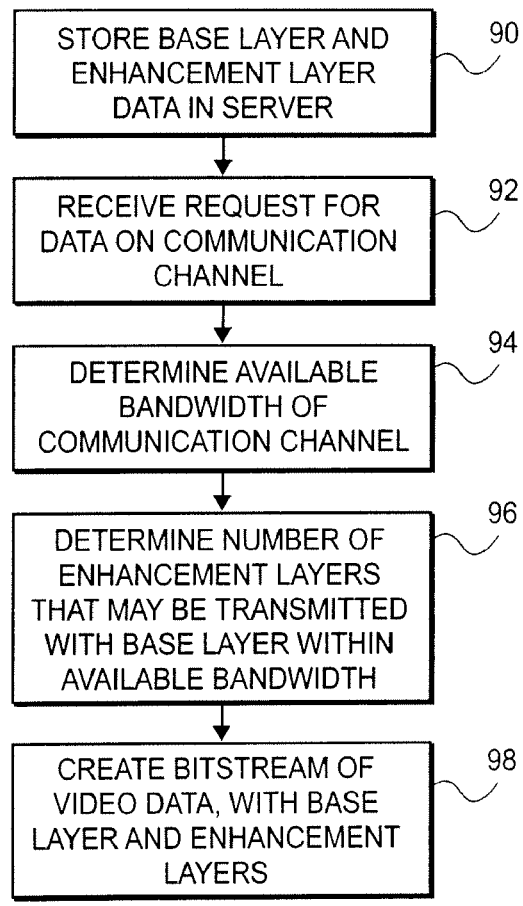
FIG. 4 is a flow chart showing steps taken by a server.

All of the compressed video data may be stored in a memory device, such as a server, pending a request for the data by a client. Typically a client is an application which requests resources, such as the video data, from the server. The steps by which a server may provide video data to a client are shown in FIG. 4. The video data, including the base and enhancement layers, are stored in the server's memory (90). When a client makes a request to the server for the video data along a communication channel (92), a processor in the server determines the amount of bandwidth on the client's communication channel (94). The are many ways in which the server may ascertain the amount of available bandwidth. One way is to have bandwidth information provided by the client. A processor in the server further determines how many enhancement layers may be reliably transmitted along the channel, within the available bandwidth (96).

After determining how many enhancement layers may be sent, the server may prepare a bitstream of video data to be transmitted to the client (98). The bitstream to be transmitted may include a base layer and one or more enhancement layers, up to the bandwidth of the available channel. The number of enhancement layers sent by the server need not be a whole number. In this way, flexibility is added to video transmissions by adjusting the number of enhancement layers transmitted to the client according to the client's bandwidth.

To prepare the bitstream, the server may use a demultiplexer to separate the base layer data from h enhancement layer data, and may then parse the enhancement layer data into a bitstream of a suitable number of enhancement layers. Start codes inserted during the encoding process may be used for parsing. The enhancement layer bit planes are ordinarily arranged in the order of most significant to least significant, and the server will send the layers in order of their significance. Transmitted enhancement layers will represent more significant corrections to the base layer, and non-transmitted layers will represent less significant corrections. The base layer and parsed enhancement layers may be multiplexed into a single bitstream prior to transmission.

Figure 5:
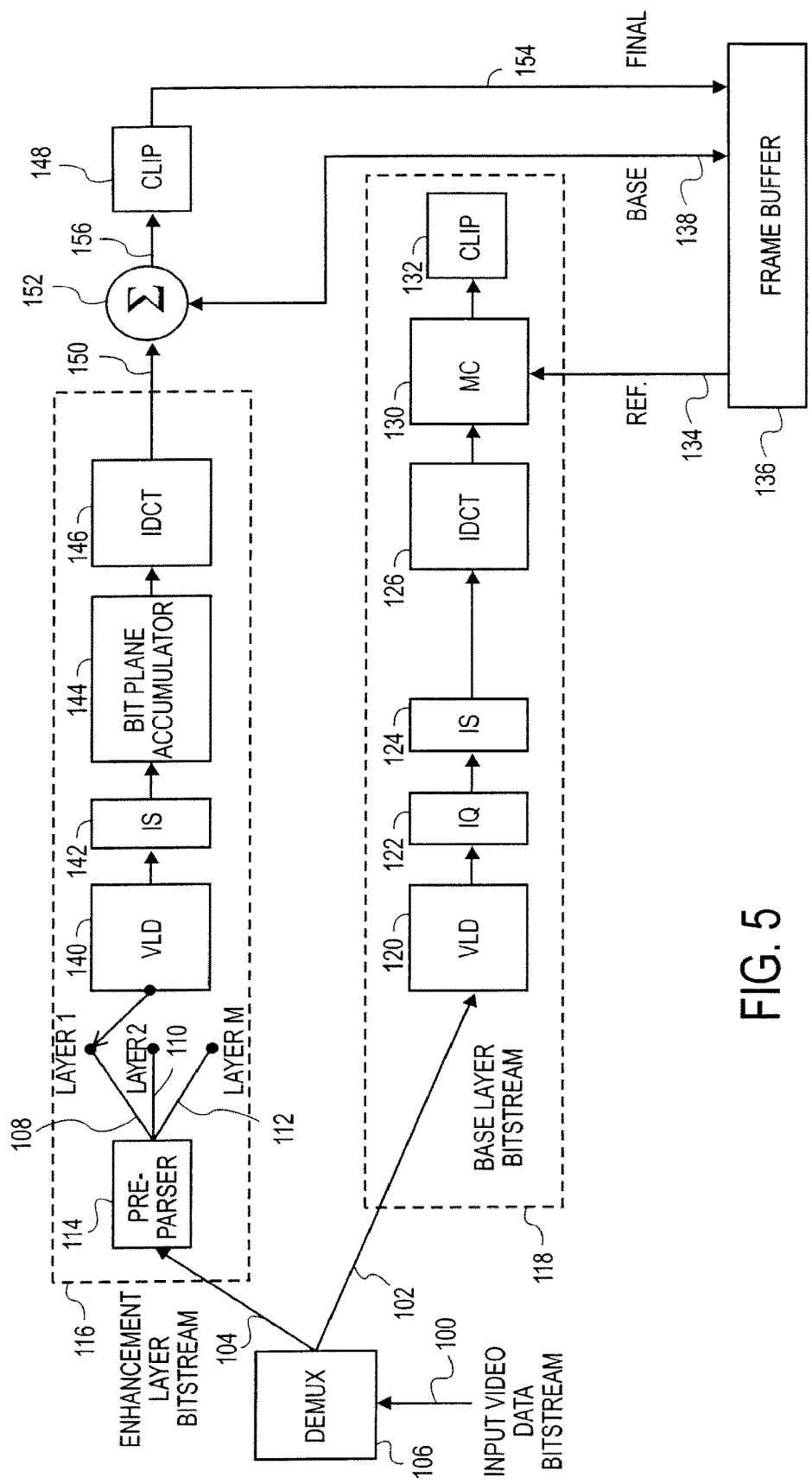
FIG. 5 is a block diagram showing video decoding.

FIG. 5 demonstrates a method for decoding and recovery of video data that has been transmitted by a server over a communication channel and received by a client. At the receiving end, the input to the decoder includes a bitstream of video data 100. The bitstream of video data 100 may be separated into a bitstream of base layer data 102 and a bitstream of enhancement layer data 104. A demultiplexer (Demux) 106 may be used to separate the bitstreams.

The base layer and the enhancement layers may be subjected to different decoding processes, or "pipelines" 116, 118. Just as the encoding of base and enhancement layers may not have involved identical steps, there may be some differences in the decoding processes as well.

In the base layer decoding pipeline 118, the base layer may undergo variable length decoding (VLD) 120, an inverse quantization (IQ) 122, an inverse scan (IS) 124, and an inverse discrete cosine transform (IDCT) 126. The VLD 120, IQ 122, IS 124 and IDCT 126 operations essentially undo the VLC 48, Q 44, S 46 and DCT 42 operations performed during encoding shown in FIG. 2. Decoded base layer data may then be processed in a motion compensator (MC) 130, which may reconstruct individual pictures based upon the changes from one picture to the next. Data from a previous, or "reference" picture 134 may be stored in a temporary memory unit called a "frame buffer" 136 and may be used as a reference. Decoded data from the IDCT 126 will be used by the MC 130 to determine how the next picture in the sequence changes from the previous picture. Because the IDCT 126 may result in the creation of invalid video data, a "clip" function 132 is used to adjust the data. For example, a valid video datum may be any number between 0 and 255 inclusive, with 0 representing a black pixel and 255 representing a white pixel. If the IDCT operation 126 returns an invalid negative number, the clip operation 132 may set that datum to 0, making the datum valid. Similarly, if the IDCT operation 126 returns a number greater than 255, the clip operation 132 may set that datum to 255. The output of the base layer pipeline 118 is base layer video data 138. The decoding techniques shown in FIG. 5 are illustrative but are not the only way to achieve decoding.

The decoding pipeline for enhancement layers 116 is different from the decoding pipeline for the base layer 118. The enhancement layer bitstream 104 may be further separated into individual bitstreams of enhancement layer data 108, 110, 112, one bitstream for each enhancement layer. A pre-parser 114 may be used to separate the enhancement layer bitstream into individual bitstreams of enhancement layer data 108, 110, 112. The pre-parser 114 may use the bit plane start codes inserted during the encoding process 76 to accomplish the pre-parsing. Pre-parsing permits the data for each enhancement layer 108, 110, 112 to be decoded in parallel.

In FIG. 5, several enhancement layers 108, 110, 112 for a single picture may need to be decoded. If a partial enhancement layer was transmitted, it forms a separate parallel input to the decoder. In FIG. 5, M layers are to be decoded in parallel. The Mth, or last, layer 112 may have been truncated by the server prior to transmission, and need not be a complete layer. Each enhancement layer may undergo a VLD process 140, and an IS process 142. Because quantization may not have been required at encoding, IQ may not be needed for the enhancement layers during decoding.

After IS process 142, the enhanced layers may be accumulated in a bit plane accumulator 144. The bit plane accumulator 144 places the most significant bit for each bit plane in its correct place, the next most significant bit in its place, and so forth. If fewer than all enhancement layers had been transmitted by the server, the bit planes may not be fully filled, and some data in the bit planes may be indeterminate. Several routines for filling out the bit planes may be employed. For example, the sites for the least significant bits may simply be filled with random noise. The bit planes may then undergo an IDCT operation 146.

The output 150 from the enhancement layer pipeline 116 represents a correction which is then summed 152 with the base layer video 138. The output from the summing operation 156 may undergo a clip function 148 to eliminate out-of-bounds data. The output 154 from the clip function 148 is a final version of a picture, enhanced to the extent permitted by the channel bandwidth, and ready for viewing. This picture may be stored in the frame buffer 136, and may serve as a reference 134 for the picture to follow. A typical viewer will read data from the frame buffer 136, which can provide a steady stream of video picture data to the viewer.

The decoder shown in FIG. 5 is exemplary. Some of the operations depicted in FIG. 5 are linear, and may appear in a different order. Summation 152 of the base layer and the enhancement layer, for example, may be performed prior to IDCT operations 126, 146. Furthermore, in an alternative embodiments, many of the operations in the enhancement layer may be done in a serial manner rather than in parallel.

In one embodiment, the enhancement layer is generated by using an alternative FGS. Similar to FGS described above, the alternative FGS coding scheme also encodes video data frames into abuse layer of relatively low quality video and multiple arbitrarily scalable enhancement bit-plane layers of increasingly higher quality video. One difference is that the alternative FGS uses higher quality references (e.g., previous enhancement frames) for some enhancement layer coding to increase the coding efficiency. Higher quality references may provide more accurate motion prediction.

Figure 6:
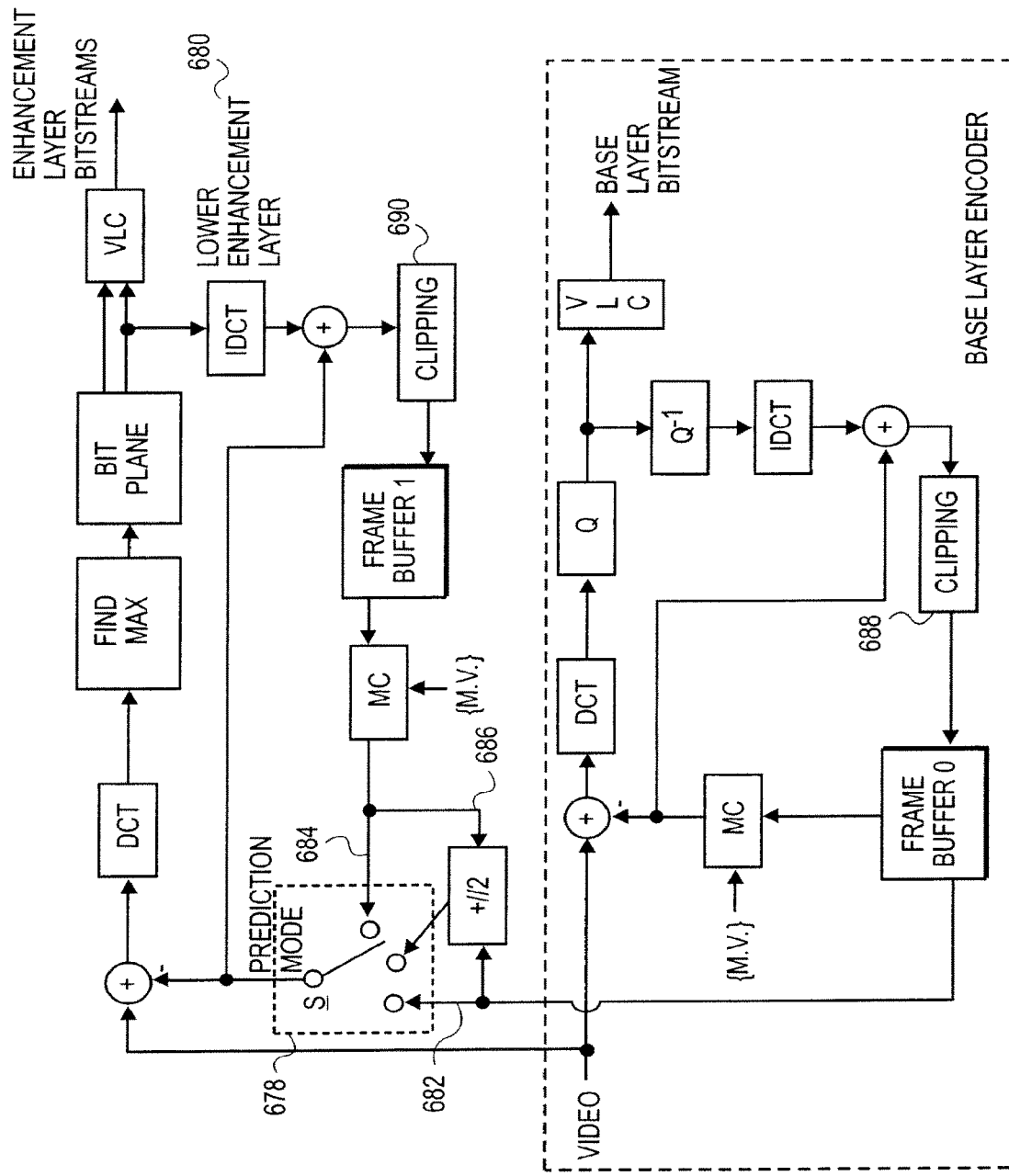
FIG. 6 is a block diagram showing video encoding and compression in accordance with one embodiment.

In one embodiment, illustrated in FIG. 6, prediction modes 678 is added to the lower enhancement layer 680. In particular, with the prediction modes 678 a subsection of the input video (e.g., a macroblock) in the enhancement layer can be predicted (i.e., generate the difference between input video and previously processed (e.g., quantized video) from one of multiple references).

In one embodiment, as illustrated in FIG. 6, there are three different prediction modes: 1) Prediction from the current reconstructed base layer 682 (using the current reconstructed base layer may reduce the error drift); 2) Prediction from the previous enhancement frame 684 (for some scenes, higher quality references come from the motion predicted enhancement layer, thus we use this mode to reduce the residue and improve coding efficiency); and 3) Prediction from the combination of the previous enhancement frame and the current reconstructed base layer 686 (e.g., an average of the two references or some other combination of the two separate references).

In one embodiment, the selection of the prediction mode is adaptively performed by comparing a subsection of the input video (e.g., a macroblock) with a subsection of the previous enhancement frame 684, the current reconstructed base layer 682, and/or compare with a combination of the previous enhancement frame and the current reconstructed base layer. Based on the comparison, the prediction mode can be selected. In one embodiment, the reference that is closest to the input video would be selected because there would be less difference to encode. In one embodiment, the criterion for closeness is based on the sum of absolute different between blocks of pixels. In one embodiment, periodically, the selection of the prediction mode is always from the current reconstructed base layer to reduce the error drift.

Furthermore, in one embodiment, the selection of the reconstructed body of data is indicated in a syntax of a bit-stream transmitted from the encoder to the decoder. Alternatively, the selection of the reconstructed body of data in the prediction mode can be transmitted from the encoder to the decoder separately from reconstructed base layer and reconstructed enhanced layer. Moreover, a set of first motion vectors are used to generate the first reconstructed body of data and the set of first motion vectors are also used to generate the second reconstructed body of data.

In addition, as further illustrated in FIG. 6, in one embodiment, the previous enhancement frame 684 is received by the prediction mode after it has undergone the spatial-domain reconstruction and clipping 690, as previously described. As well, the current reconstructed base layer 682 is also received by the prediction mode after it has undergone the spatial-domain reconstruction and clipping 688. As a result of the clipping, the complexity of the encoder and decoder may be reduced.

Figure 7:
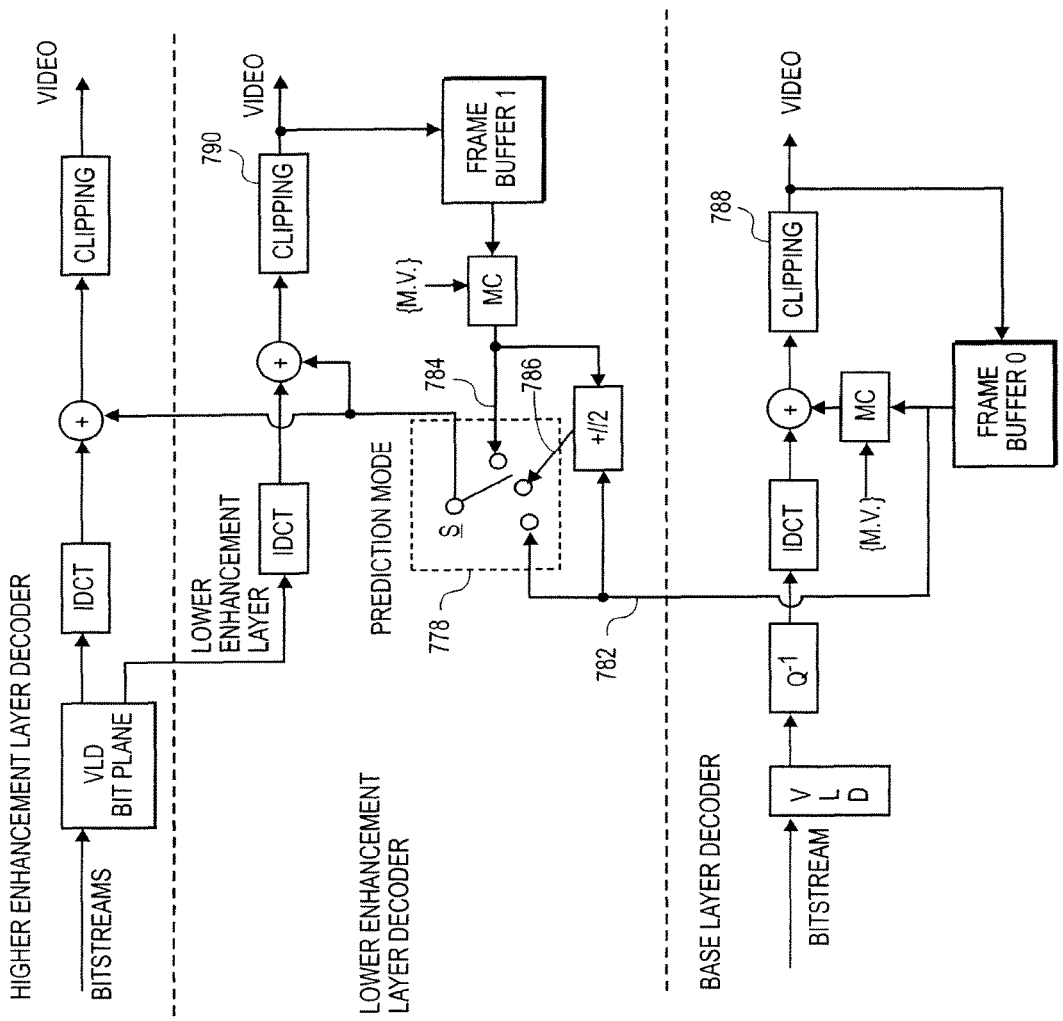
FIG. 7 is a block diagram showing video decoding in accordance with one embodiment.

Illustrated in FIG. 7, is a decoder with the prediction mode to determine which reference is to be added to the decoded enhancement layer. As illustrated, the prediction mode can select from current decoded base layer 782, the decoded previous enhancement frame 784, and/or a combination of the previous decoded enhancement frame and the decoded current base layer 786.

As further illustrated in FIG. 7, in one embodiment, the decoded previous enhancement frame 784 is received by the decoder prediction mode 778 after it has undergone the spatial-domain reconstruction and clipping 790, as previously described. As well, the decoded current reconstructed base layer 782 is also received by the prediction mode after it has undergone the spatial-domain reconstruction and clipping 788.

The methods, encoders, and decoders described above can be stored in the memory of a computer system (e.g., set top box, video recorders, etc.) as a set of instructions to be executed. In addition, the instructions to perform the method, encoders, and decoders as described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods, encoders, and decoders as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc. Furthermore, the encoders and decoders as described above could be implanted on the same hardware component, such as a graphics controller that may or may not be integrated into a chipset device.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of scalable video decoding comprising:
   receiving a bit-stream at a decoder, the bit stream including an enhancement frame layer, a base frame layer, and a syntax;
   pre-parsing the bit-stream to separate the bit-stream into enhancement layer frames, base layer frames, and syntax;
   selecting one from among a plurality of prediction modes for a current enhancement layer frame using an indication associated with the current enhancement layer frame in the syntax of the bit-stream received at the decoder;
   predicting a current enhancement layer frame using the selected prediction mode from the associated indication in the syntax, wherein the selected prediction mode is predicting the current enhancement layer frame based on a reconstructed current base layer frame, the reconstructed current base layer frame being associated with a same picture as that of the current enhancement layer frame, wherein the reconstructed current base layer frame and the previous enhancement layer frame have both undergone spatial-domain reconstruction and clipping.

2. The method of claim 1, wherein the memory comprises a frame buffer.

3. The method of claim 1, wherein predicting the current enhancement layer frame comprises predicting at least a portion of the current enhancement layer frame.

4. The method of claim 3, wherein the portion of the current enhancement layer frame comprises a macroblock.

5. The method of claim 1, wherein the reconstructed current base layer frame and the previous enhancement layer frame comprise reference frames.

6. The method of claim 5, wherein the reconstructed current base layer frame comprises a lower quality reference frame, and wherein the previous enhancement layer frame comprises a higher quality reference frame.

7. The method of claim 1, wherein a second one of the plurality of prediction modes is predicting the current enhancement frame based on the previous enhancement layer and a third one of the plurality of prediction modes is predicting the current enhancement frame based on the previous enhancement layer frame and the reconstructed current base layer frame and wherein an indication associated with a next enhancement layer fame in the syntax of the bit-stream indicates one of the second and the third prediction modes.

8. One or more non-transitory machine-readable media including instructions to be executed that, when executed, cause a computing device to:
   receive a bit-stream at a decoder, the bit stream including an enhancement frame layer, a base frame layer, and a syntax;
   pre-parse the bit-stream to separate the bit-stream into enhancement layer frames, base layer frames, and syntax;

select one from among a plurality of prediction modes for a current enhancement layer frame using an indication associated with the current enhancement layer frame in the syntax of the bit-stream received at the decoder;

predict a current enhancement layer frame using the selected prediction mode from the associated indication in the syntax, wherein the selected prediction mode is predicting the current enhancement layer frame based on a reconstructed current base layer frame, the reconstructed current base layer frame being associated with a same picture as that of the current enhancement layer frame, wherein the reconstructed current base layer frame and the previous enhancement layer frame have both undergone spatial-domain reconstruction and clipping.

9. The one or more machine-readable media of claim 8, wherein the memory comprises a frame buffer.

10. The one or more machine-readable media of claim 8, wherein predicting the current enhancement layer frame comprises predicting at least a portion of the current enhancement layer frame.

11. The one or more machine-readable media of claim 10, wherein the portion of the current enhancement layer frame comprises a macroblock.

12. The one or more machine-readable media of claim 8, wherein the reconstructed current base layer fame and the previous enhancement layer frame comprise reference frames.

13. The one or more machine-readable media of claim 12, wherein the reconstructed current base layer frame comprises a lower quality reference frame, and where in the previous enhancement layer frame comprises a higher quality reference fame.

14. The one or more machine-readable media of claim 8, wherein a second one of the plurality of prediction modes is predicting the current enhancement frame based on the previous enhancement layer and a third one of the plurality of prediction modes is predicting the current enhancement frame based on the previous enhancement layer frame and the reconstructed current base layer frame and wherein an indication associated with a next enhancement layer fame in the syntax of the bit-stream indicates one of the second and the third prediction modes.

15. A device for decoding scalable video data, comprising:
   memory; and
   an interface of the decoder to receive a bit-stream, the bit-stream including an enhancement frame layer, a base frame layer, and a syntax;
   a parser to pre-parse the bit-stream to separate the bit-stream into enhancement layer frames, base layer frames, and syntax;
   an enhancement layer decoder coupled to the memory, the enhancement layer decoder to select one from among a plurality of prediction modes for a current enhancement layer frame using an indication associated with the current enhancement layer frame in the syntax of the bit-stream received at the decoder, to predict a current enhancement layer frame using the selected prediction mode from the associated indication in the syntax, wherein the selected prediction mode is prediction of the current enhancement layer frame based on a reconstructed current base layer frame, the reconstructed current base layer frame being associated with the same picture as that of the current enhancement layer frame, wherein the memory is to store at least one of a previous enhancement layer frame or the reconstructed current base layer frame, wherein the reconstructed current base layer frame and the previous enhancement layer frame have both undergone spatial domain reconstruction and clipping.

16. The device of claim 15, further comprising a variable length decoder to decode the bitstream syntax.

17. The device of claim 15, further comprising an inverse discrete cosine transform (IDCT) unit to perform an IDCT operation on enhancement layer video data, the enhancement layer video data to specify at least in part the current enhancement layer frame.

18. The device of claim 15, wherein the memory comprises the frame buffer.

19. The device of claim 15, wherein the reconstructed current base layer frame and the previous enhancement layer frame comprise reference frames.

20. The device of claim 15, wherein the reconstructed current base layer frame comprise a lower quality reference frame, and wherein the previous enhancement layer frame comprises a higher quality reference frame.

21. The device of claim 15, wherein a second one of the plurality of prediction modes is predicting the current enhancement frame based on the previous enhancement layer and a third one of the plurality of prediction modes is predicting the current enhancement frame based on the previous enhancement layer frame and the reconstructed current base layer frame and wherein an indication associated with a next enhancement layer fame in the syntax of the bit-stream indicates one of the second and the third prediction modes.

* * * * *